United States Patent [19]

Heath

[11] Patent Number: 5,000,008

[45] Date of Patent: Mar. 19, 1991

[54] STORAGE SYSTEM FOR ICE SLURRY

[75] Inventor: Harold R. Heath, Houston, Tex.

[73] Assignee: Coca-Cola Company, Atlanta, Ga.

[21] Appl. No.: 460,772

[22] Filed: Jan. 4, 1990

[51] Int. Cl.$^5$ .............................................. F25D 3/02
[52] U.S. Cl. ........................................... 62/59; 62/123
[58] Field of Search ........................... 62/59, 123, 532

[56] References Cited

U.S. PATENT DOCUMENTS

| | | | |
|---|---|---|---|
| 2,996,894 | 8/1961 | Shade | 62/59 |
| 3,251,192 | 5/1966 | Rich, Jr. et al. | 62/123 X |
| 4,064,931 | 12/1977 | Laing | 62/59 X |
| 4,086,958 | 5/1978 | Lindner et al. | 62/59 X |
| 4,509,344 | 4/1985 | Ludwigsen et al. | 62/123 X |
| 4,517,806 | 5/1985 | Korzonas | 62/123 |
| 4,596,120 | 6/1986 | Knodel | 62/59 |

Primary Examiner—William E. Tapolcai
Attorney, Agent, or Firm—Kenyon & Kenyon

[57] ABSTRACT

A method and apparatus for storing an ice slurry of a aqueous liquid is disclosed. A storage tank contains an ice slurry which is in the form of a layer of ice (i.e., an ice cap) floating on liquid. Liquid is pumped out from the lower part of the storage tank and fed to the top of the storage tank. The liquid which is fed to the top of the ice storage tank is returned to the lower part of the tank substantially without contacting the layer of ice contained therein via a vertically oriented tube. By pumping the liquid out of the lower part of the storage tank and recirculating it, pressure build-up due to the ice cap is controlled. In one embodiment, the liquid to be stored is a fruit juice such as orange juice, grapefruit juice, pineapple juice, grape juice, apple juice, or the like.

26 Claims, 1 Drawing Sheet

STORAGE SYSTEM FOR ICE SLURRY

BACKGROUND OF THE INVENTION

The present invention is related to an apparatus and method for storing an ice slurry of an aqueous liquid of a fruit such as orange juice, grapefruit juice, pineapple juice, grape juice, apple juice and the like for subsequent use or reconstitution.

It is often the case that aqueous beverages must be stored under stabilized conditions in large quantities after preparation and prior to distribution to consumers. For instance, fruit juices such as orange, grapefruit, pineapple, grape and apple juice are pasteurized in order to deactivate enzymes and kill microorganisms, and stored under refrigerated conditions in order to retard temperature induced flavor changes and to control the presence of microorganisms. Juices may also be deaerated in order to control oxidation and accompanying degradation.

At present, it is a common practice that aqueous beverages such as orange juice which must be kept cold or frozen in order to avoid rapid deterioration and/or growth of microorganisms are stored in drums (e.g., 55 gallons), bags or in frozen blocks following their preparation and prior to packaging for distribution to consumers. The juice stored in this manner requires labor intensive systems for filling, storing and retrieving the juice. Furthermore, the cost of packaging material can add significantly to the selling price of the juice. Exposure during the retrieval process may cause loss of juice or flavor qualities and provides opportunities for contamination or adulturation. Open block storage of juices can have the disadvantage of losing water vapor and may leak concentrate during storage.

Other systems for storing ice slurries are known for purposes other than the storage of beverages. For instance, ice slurries have been used for cooling purposes such as in air-conditioning systems of commercial buildings. Such systems may operate by feeding water through a heat exchanger to convert part of the water to ice, feeding the resulting ice slurry to a storage tank, removing cold aqueous liquid from the storage tank and feeding it through a heat exchanger in order to cool a second fluid which is to be used for cooling purposes The now warm aqueous liquid is returned to the storage tank and is cooled by contact with the ice that is stored therein.

U.S Pat. No. 4,584,843 (Pronger, Jr. et al.) relates to a method and apparatus for storing an ice slurry for cooling purposes such as in air-conditioning systems of commercial buildings, which is said to increase storage capacity. Aqueous liquid is removed from storage tank (preferably from the lower part of the tank) and fed through a heat exchanger to convert at least part of the aqueous liquid to ice crystals. The resulting slurry is then fed to a distribution conduit system located in the upper part of the storage tank, where it flows through a plurality of nozzles and descends uniformly. The ice crystals are evenly deposited as a bed of ice with a horizontal surface. Cold aqueous liquid is then removed from the lower part of the storage tank and fed through a heat exchanger in indirect heat exchange with a fluid to be cooled for cooling purposes. The now warm aqueous liquid is then returned to the storage tank, where it is cooled via downward trikling through the ice therein.

U.S. Pat. No. 4,509,344 (Ludwigsen et al.), U.S. Pat. No. 4,596,120 (Knodel et al.), and U.S. Pat. No. 4,254,635 (Simon et al.) relate to other cooling systems.

While such cooling systems are applicable to some commercial cooling applications, there has been no disclosure or suggestion that they would be applicable to the storage of fruit juice type beverages. Moreover, such processes would not be effective for the storage of fruit juice beverages which must be kept at low temperatures because they expose the stored liquid to warm temperatures. Aqueous beverages including fruit juices such as orange juice and the like cannot be warmed to any appreciable degree due to stability and contamination concerns.

Ice slurries have also been prepared for the purpose of producing an ice slush. For example, U.S. Pat. No. 4,750,336 (Margen) relates to an ice slush apparatus for producing ice slush which is said to prevent ice build-up. An aqueous liquid is passed through a conduit having cooled walls in which ice particles can form. In order to prevent ice build-up on the conduit walls, a helical path is provided which causes the aqueous liquid to contact the cooled walls. The ice particles are drawn to the center of the helical flow due to their lower density while the heavier liquid portion moves toward the walls due to gravitational forces generated. However, this system is not designed for storing large quantities of liquids.

U.S. Pat. No. 4,096,709 (Barthel) relates to a rupture-preventing air-releasing water-freezing reservoir. To prevent rupture caused by the expansion of water upon freezing and at the same time release the warmer air after producing the freezing of water into ice, the reservoir is surrounded by duplex wall structure of insulating material such as styrofoam in the form of slabs spaced inward from the tank wall by compression springs. The air escapes through the interstices between the styrofoam after expending its freezing effect upon the body of water inside the inner styrofoam wall. The water located between the slabs is prevented from freezing by the insulating effect of the styrofoam. This system is not practical for use in storing large quantities of aqueous liquids.

It is therefore an advantage of the present invention to provide a method and apparatus for storing an ice slurry of an aqueous fruit juice while substantially reducing the chances of rupturing the storage tank.

It is another advantage of the present invention to provide a method and apparatus for storing an ice slurry of an aqueous fruit juice such as orange, grapefruit, pineapple, grape, apple and the like which allows for the release of pressure build-up within the ice storage tank caused by expansion of the liquid during ice formation.

It is also an advantage of the present invention to provide a method and apparatus for the efficient storage of large quantities of an aqueous fruit juice in an ice slurry state.

It is a further advantage of the present invention to provide a method and apparatus for storing an ice slurry of a fruit juice type beverage in a manner which maintains a substantially stable environment.

It is yet another advantage of the present invention to provide a method and apparatus for storing a slurry of a heat labile fruit juice type beverage in large quantities under a commercially sterile or aseptic conditions while allowing for a melt down of the slurry substantially without leaving any ice while maintaining a temperature at which microorganism growth does not affect the stability of the beverage.

SUMMARY OF THE INVENTION

In accordance with the above-mentioned objectives and others, the present invention relates to an apparatus in the form of a storage tank for storing an aqueous liquid in an ice slurry state. Due to the lower density of ice as compared to liquid, the ice slurry is progressively more ice-free toward the bottom of the storage tank such that a layer of ice or ice slurry floats on a layer of liquid. A transferring means is provided for removing the liquid from the bottom of the storage tank to the top of the tank. A communicating means located within the tank has an opening above the layer of ice and receives the liquid from the transferring means and returns it to the ice slurry at a point below the ice cap without the liquid substantially contacting the layer of ice. Preferably, the communicating means is centrally located within the storage tank. It is preferred that the apparatus further comprise temperature controlling means for controlling the temperature of the transferring means such that ice does not begin to grow therein and thereby clog or plug the transferring means. Preferably, the temperature of the ice slurry flowing through the transferring means is maintained at or just above the freezing point of the aqueous liquid.

Excessive pressure build-up in the storage tank caused by the formation of ice under an ice cap is prevented by the circulation of the relatively ice-free liquid.

The present invention is also related to a method for storing an aqueous liquid in an ice slurry state which comprises introducing an ice slurry of an aqueous liquid into a storage tank and maintaining the temperature of the ice slurry such that a layer of ice floats on a layer of mother liquid, withdrawing liquid from the bottom of the storage tank and feeding it to the top of the tank at a rate faster than the rate of ice floatation within the communicating means, and transferring the liquid below the layer of ice substantially without the liquid contacting the layer of ice, thus keeping the ice particles well dispersed.

When it is desired to empty the storage tank, the ice slurry is substantially converted back to the liquid state. This is accomplished by a thawing step in which the transferring means and walls of the storage tank are warmed in order to raise the temperature of aqueous liquid. The thawing step preferably also comprises directing a portion of the warmed aqueous liquid from the transferring means onto the upper surface of the ice cap to increase the thawing rate.

After the ice slurry has been sufficiently warmed such that substantially all of the ice has melted and the aqueous liquid has been substantially returned to its original state, the aqueous liquid may be withdrawn from the storage tank. Thereafter, the aqueous liquid may undergo further processing and packaging.

In one embodiment of the present invention, the aqueous liquid is a fruit juice such as orange juice, grapefruit juice, pineapple juice, grape juice, apple juice, or the like. Preferably, the fruit juice which is to be stored includes orange juice, grapefruit juice, and the like. For practical purposes, it is preferred that the juice to be stored has previously been pasteurized and that the system be keep as near asepsis as possible. It is with this in mind that the present apparatus has been designed such that it is easy to clean.

DETAILED DESCRIPTION

Figure 1:
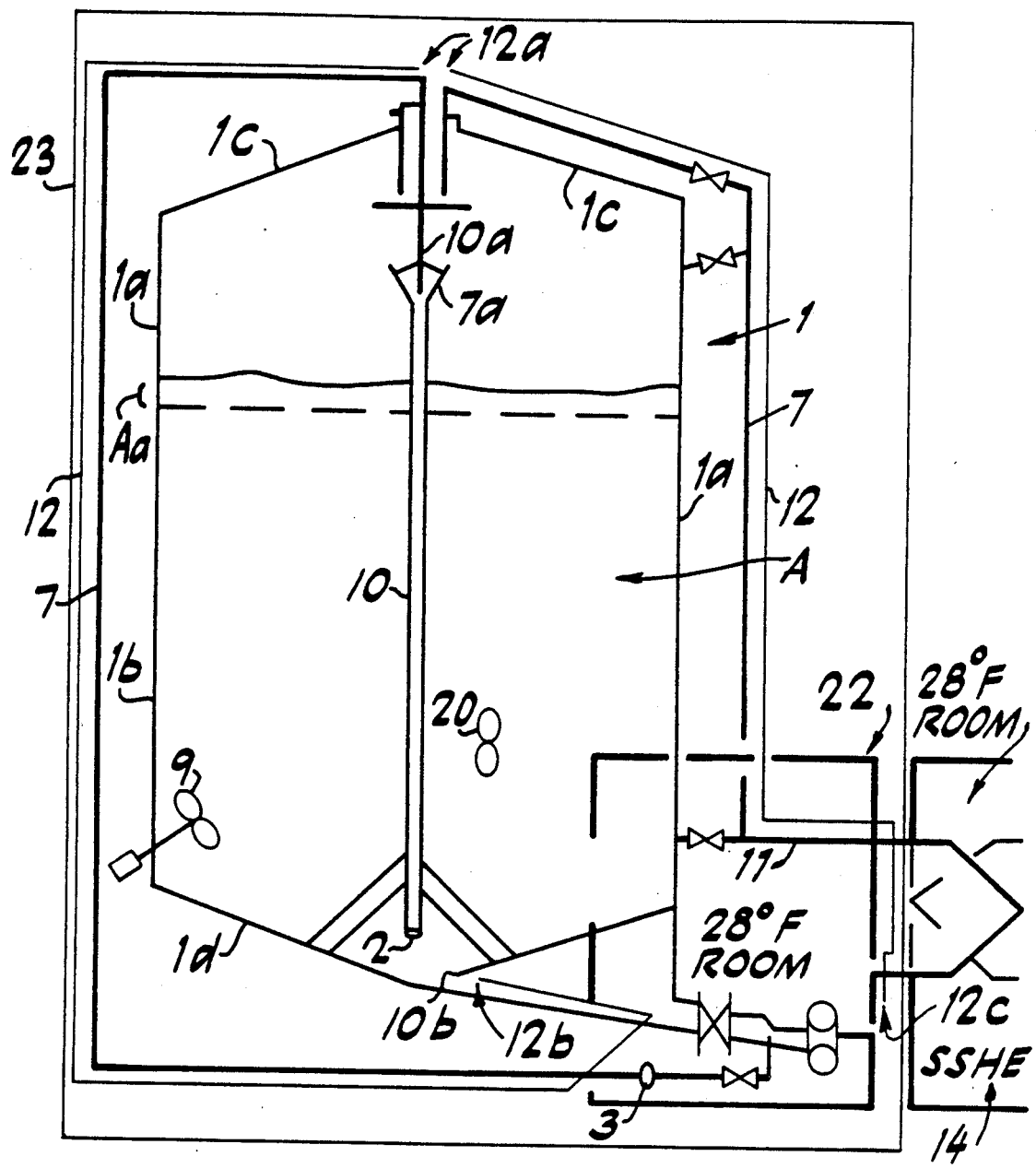
FIG. 1 is a cross-sectional view of an apparatus in accordance with the present invention.

When an aqueous beverage is stored in an ice slurry state in a container, whether it be a drum, a storage tank, etc., a layer of ice (i.e., an ice cap) forms at the upper surface of the slurry. This is in part due to the fact that ice tends to float to the top of the slurry because it is less dense than the aqueous mother liquid. At the same time, the ice slurry in the lower part of the tank becomes relatively ice free. As this occurs, the freezing point of the mother liquid decreases. When the walls of the tank are cooled, the slurry along the walls is colder relative to the slurry in the center of the tank, and the portion of the ice cap which is in proximity to the side walls tends to be more solid relative to the center of the tank.

As the ice cap progressively becomes thicker and more rigid, it begins to resist further upward movement. Formation of additional ice below the ice cap exerts increasingly greater pressure against the liquid which is trapped below the ice cap and within the confines of the container walls. This in turn causes the liquid to exert greater pressure against the container. Eventually, the pressure builds up to such a level that the walls of an economically designed container become susceptible to deformation and possible rupture. By "economically designed" it is meant that the tank may be filled to capacity without providing for the hazards of ice formation.

The present invention is based in part on the known principle that by transferring ice slurry from the bottom of the container to the top of the container at a rate faster than the rate of ice floatation, the freezing of the slurry into a solid ice cap will not occur. Sufficient agitation or pumping of an entire tank would be expensive and virtually impossible at ice percentages needed for long term storage. The present invention takes advantage of this known principle without the penalty of stirring the entire tank.

The aqueous liquid which is to be stored may be introduced into the storage tank in an ice slurry state, or may be introduced as a liquid and cooled to an ice slurry state within the storage tank. The quantity of liquid which is pumped into the storage tank is monitored and controlled by a metering device, a gauge, or the like.

The capacity of the storage tank is dependent upon the percentage of ice desired in the ice slurry. Expansion of the ice slurry due to ice formation should be considered when making this determination. As a practical limit, the storage tank may be filled to about 80% capacity when an ice-free liquid juice is introduced and it is desired that 70% ice slurry is to be stored.

Preferably, the liquid is fed into the storage tank at a temperature in proximity to its freezing point. After a sufficient level of liquid is fed into the tank, some of the liquid is circulated through a heat exchanger until an ice slurry containing the desired percentage of ice is obtained. The heat exchanger used may be any device known in the art, such as a scraped surface heat exchanger. It is preferred that the ice slurry be made external to the storage tank because the slurry can be formed more rapidly. Another less efficient but acceptable manner to prepare an ice slurry would be to cool the walls of the storage tank to suitable a temperature below the freezing point of the liquid to be stored.

The storage tank has a top, a bottom and side walls. On the side walls one can define an upper part of the tank above the ice slurry level and a lower part of the tank below the ice cap. The storage tank is preferably maintained in a cold environment, at a temperature below the freezing point of the liquid to be stored. The cold environment may be accomplished by any means known in the art, such as by placing the storage tank in an enclosure or "cold room" which is kept at a predetermined temperature. It is also possible to accomplish this by maintaining the storage tank in a cold environment using a jacket or coil-wrapping the tank with a heat exchanger, or by providing internal coils for heat exchange purposes.

The circulation of liquid from the bottom of the tank to the top of the tank is accomplished via an opening located in the lower part of the storage tank through which the slurry flows into a transferring means, such as a pipe assembly. A pump is preferably used to draw the liquid from the bottom of the tank into the pipe assembly. The flow of the liquid is directed via the pipe assembly to the top of the tank. The opening for removing the liquid may be located anywhere below the ice cap, although it is preferable that the opening be located in the bottom of the storage tank. Likewise, the transferring means may return the liquid to the tank at any point above the ice cap. However, it is preferable that the transferring means return the liquid in proximity of the top of the storage tank so that a vent can always be provided above the ice cap.

The liquid is in turn transferred from the transferring means to a communicating means such as a tube without substantially contacting the layer of ice in the upper part of the tank. The communicating means returns the necessary quantity of liquid that is required to replace that which is withdrawn to the lower part of the storage tank. The upper portion of the communicating means acts as a vent so that any excess liquid is allowed to spill out through the vent onto the ice cap.

In order to control pressure build-up due to the formation of ice below the ice cap, the liquid in the lower part of the storage tank is pumped out of the opening vented in the top headspace and drained back to the lower part of the tank at a rate faster than the rate of ice floatation.

By continuously circulating the liquid through the communicating means (in a downward direction) at a rate faster than the rate of ice floatation, the freezing of the liquid within the communicating means and the plugging of the same is prevented. The rate at which the liquid is circulated is determined by the cross-sectional area of the communicating means and flow characteristics of the liquid being stored, and can be adjusted to suit the particular needs of the system at any given time.

If the rate of pumping is insufficient to relieve the pressure build-up in the lower part of the tank, or the pump fails altogether, the liquid may also flow upward through the communicating means and spill out through the vent onto the top of the ice cap, thereby relieving pressure.

In a preferred embodiment of the present invention, the liquid juice to be stored is single strength orange juice having a Brix from about 7° to about 15°, and most preferably from about 10° to about 13°. Single strength orange juice having such a Brix has a freezing point of about 28° F. In order to preserve the flavor and other qualities of the orange juice, the temperature of the juice should not be allowed to rise over about 35° F. It is preferred to store the juice in as stable and aseptic condition as possible. Therefore, it is preferred that the juice which is to be stored in the storage tank be pasteurized. Pasteurization temperatures should be high enough to deactivate enzymes such as pectinase and kill deleterious microorganisms. It is also preferred that the juice be deaerated in order to reduce oxidation of the juice.

Referring to FIG. 1, a storage tank 1 is shown containing an ice slurry A. The storage tank 1 has side walls comprising an upper part 1a and a lower part 1b. As ice builds up in the storage tank 1, an ice cap Aa is formed on the upper surface of the slurry A. If the ice cap Aa becomes too thick, it may cling to the sides of the tank and trap the ice forming liquid below which would exert increasing amounts of pressure against the same.

An opening 2 is located in the lower portion 1b, and preferably near the bottom 1d, of the storage tank 1. Pump 3 pulls liquid out through opening 2 in the bottom 1d of the storage tank 1. The liquid is directed to the upper portion 1a and preferably to the top of 1c of the storage tank 1 via a pipe assembly 7. Instead of being allowed to contact the ice cap Aa or ice slurry located in the upper part 1a of the storage tank, the liquid is directed into the upper opening 10a of a substantially vertically oriented communicating tube 10 which is located within the storage tank. Communicating tube 10 has openings which serve as a communication means between the upper and lower parts of the storage tank 1. The upper opening 10a of the communicating tube 10 is above the upper surface of the ice cap Aa, while the lower opening 10b of the communicating tube 10 is located below the ice cap in the lower portion 1b of the tank 1. The liquid which flows through vertical tube 10 thus returns to the lower portion 1b of the tank 1. The communicating tube 10 thus provides a vent in part as a vertical liquid column through the ice cap functioning as a means of relieving pressure at critical times such as when ice is being formed.

The temperature of the liquid being transported through the pipe assembly 7 is controlled in order to prevent freezing of the slurry within the same and in the communicating tube 10. At the same time, the temperature of the liquid being transported through the pipe assembly 7 should not be raised to such a level that the liquid is warmed to an undesirable level, e.g., such that the liquid within the storage tank is warmed to a significant degree. The temperature is controlled by any means known in the art. In FIG. 1, glycol tracer lines 12 having inlets 12a and outlets 12b and 12c are shown which run along the pipe assembly 7. The temperature of the glycol tracer lines 12 are supplied by a heat exchanger system (not shown).

In the preferred embodiment the liquid pumped through the scraped surface heat exchanger is exposed to a temperature substantially below the freezing point of the liquid. Thus an ice containing slurry is formed and returned to the tank where the ice crystals separate naturally. The circulation of the liquid in this manner is preferably continued until the percentage of ice in the stored liquid reaches a predetermined level. Once the desired ice percentage is achieved, the freezing system may be turned off.

Any excess pressure build-up in the system caused by ice formation is vented by the above-mentioned circulation of liquid through pump 3 or in case of pump failure through the communicating tube. Pressure build-up alone will force liquid to vent out through the vent at 10a. Accordingly, it may not be necessary to cause the circulation of liquid once an equilibrium is established.

The possibility of deformation of the tank and/or rupture is significantly decreased by the above-mentioned circulation of the liquid. As a result, higher percentage of ice can be stored in the storage tank with a substantially decreased risk of deformation and/or rupture.

The present invention also provides a means for thawing the ice slurry when it is desired to empty the tank. At such time, the temperature of the glycol tracer line 12 is raised to a predetermined level effective to melt ice particles and warm the liquid circulating through the pipe assembly 7. The predetermined temperature must be chosen with regard to the particular characteristics of the stored aqueous liquid. For example, when storing aqueous liquids such as citrus juices, the glycol tracer lines 12 are brought to a maximum usable temperature which is slightly above the freezing point of the particular citrus juice. This is done to preserve the stability and flavor of the juice. During thawing it is preferred that heat be applied to the side walls of the storage tank 1. This has the effect of releasing the attached ice cap Aa from the side walls of the storage tank 1. Only a small gap of liquid (approximately 1/16 inch) is needed between to separate the ice cap from the interior side walls of the tank before the ice cap is released.

Heat may be applied to the storage tank 1 by any method which will release the ice cap Aa from the side walls. In a preferred embodiment, this is accomplished by blowing warm air (via a fan) against the tank at a temperature slightly above the freezing point of the juice. For example, when the storage tank holds approximately 140,000 gallons, it is preferred that air slightly above the freezing point of the juice is blown against the walls of the tank at from about 800 to about 12000 cubic feet per minute (cpm), and most preferably at about 1000 cpm. By also applying heat to the outside of the tank, the ice cap will become free to float about the upper surface Aa of the slurry. In another embodiment, coils which are installed in the side walls of tank are used to supply heat.

Heating the side walls of the storage tank is advantageous because it prevents the ice cap from clinging to the side walls of the tank as when some of liquid below the ice cap is withdrawn. If the tank wall is not warmed and some of the liquid below the ice cap is removed, it is possible that a sudden increase in fluid pressure caused by the impact of the ice cap when it does release will damage and/or rupture the storage tank.

The thawing of the storage tank continues until the average temperature of the juice is approximately the same as it was prior to freezing. In practice, the thawing of the storage tank begins several days prior to removing the contents in the case of large commercial installations. In the case of a citrus juice, the temperature of the liquid preferably should not rise to more than about 1-2 degrees above the ice formation-equilibrium temperature of the stored juice, to minimize the possible growth of microorganisms and to preserve the juice flavor.

In a preferred embodiment, during thawing a substantial flow of juice through the pipe assembly 7a spills over the outer edge of the communicating tube 10 and onto the ice cap Aa. The desired flow is determined by the amount of juice to be thawed and temperature to which the product can be safely raised. By directing the relatively warmer liquid onto the ice cap, this thawing process is enhanced.

In one embodiment, the communicating tube 10 includes a vertical mixer 20 which shaves from the floating ice cap when it comes into contact with the vertical mixer blade. This permits even faster melting by the inclusion of the shavings in the warmed slurry.

The apparatus may also include agitation means located in proximity to the bottom of the storage tank for agitating the thawed liquid juice to achieve a uniform mixture prior to draining the storage tank. This is especially preferred when the juice has a significant amount of pulp or other suspended material, as in the case of orange juice.

Referring to FIG. 1, an agitator 9 is provided in the lower portion 1b of the storage tank 1. Once the stored slurry has been sufficiently thawed, agitator 9 is turned on in order to stir the now-liquid product into a uniform mixture. The agitation of the liquid juice will also serve to provide a more uniform temperature.

The storage tank 1 is then drained via outlet 17 to a receiving system where the juice undergoes further processing and packaging. It is preferred that pump 3 and vertical mixer 20 (if installed), run continually while emptying the storage tank, so that part of the flow of the liquid goes through the pipe system 7 until the tank is substantially empty.

The storage tank used in the present invention may be any size; however, it is envisioned that the present invention is suitable for tanks having a capacity from about 10,000 gallons to about 500,000 gallons or more.

For example, when an ice slurry of a single strength orange juice of about 12° Brix and having a freezing point of about 28° F. is to be stored, the storage tank 1 is preferably maintained at a temperature from about 5° F. to about 17° F. during storage of the orange juice. This may be accomplished by placing the storage tank 1 inside a cold room 23. At such a temperature, the orange juice will be stored at about a 70% ice slurry.

As previously explained, the temperature of the glycol tracer line 12 should be controlled in order to prevent the possibility of freeze-up of the juice within the pipe assembly 7. Accordingly, in the present example, the glycol tracer line 12 is adjusted to keep the temperature of the pipe assembly 7 from about 18° F. to about 30° F. and most preferably at about 18° F.±2° during storage. This is because the concentrated orange juice from the bottom of the storage tank 1 in the present example which is withdrawn and pumped through pipe assembly 7 will have a Brix of about 42° and a freezing point of about 18° F. It is also preferred that an enclosure 22 which is kept at about 28° F. surround the pump 3 and the base of the storage tank 1 in order to prevent freezing of the piping and pumps.

During the thawing of the single strength orange juice, it is preferred that the temperature of the glycol tracer line 12 be raised to about 29°-30° F. and that the side walls of the storage tank be warmed with air at a temperature of about 32° F. The interior of enclosure 22 should still be kept at about 28° F. The thawing step should continue until the temperature of the thawed single strength orange juice in the storage tank is from about 29° F. to about 30° F.

In another prepared embodiment of the present invention, the orange juice which is to be stored is concentrated. The temperatures related above with reference to single strength orange juice will be adjusted downward in reflection of the higher solids content and lower freezing point of the concentrate. The amount of temperature adjustment depends upon the particular concentration of the juice chosen, and is readily deducible to those skilled in the art. For example, orange juice concentrated to 42° Brix has an initial freezing point of about 18° F. Orange juice concentrated to 42° Brix should be stored in an ice storage tank kept in an environment at a temperature of about 10° F. When the tank is to be emptied, the temperature of the tank should be raised to about 18° F. The temperature of the glycol tracer line should once again be controlled to prevent the possibility of freeze-up in the pipe assembly 7.

The examples provided above are not meant to be exclusive. Such variations of the present invention as would be obvious to those skilled in the art are contemplated to be within the scope of the appended claims.

What is claimed is:

1. An apparatus for storing an aqueous liquid in an ice slurry state, comprising
   a storage tank for storing an aqueous liquid in an ice slurry state, said storage tank being maintained at a temperature such that a layer of ice floats on a layer of liquid,
   transferring means for removing liquid from the bottom of said storage tank and feeding it to the top of said storage tank, said transferring means being maintained at a temperature such that the flow of liquid does not freeze solid, and
   communicating means located within said storage tank having an opening located above and an opening below the layer of ice in said storage tank, said communicating means receiving the liquid from said transferring means and returning it to the bottom of said tank substantially without the liquid contacting the layer of ice.

2. The apparatus of claim 1, wherein said transferring means comprises a pipe system including a pump for pumping the liquid out of the bottom of said storage tank at a rate faster than the rate of ice floatation.

3. The apparatus of claim 2, wherein said communicating means comprises a vertically oriented tube.

4. The apparatus of claim 3, further comprising temperature controlling means for controlling the temperature of said transferring means such that ice does not build up in said transferring means.

5. The apparatus of claim 4, wherein said temperature controlling means warms the liquid flowing through said transferring means to a temperature slightly above its freezing point when the ice slurry within the ice storage tank is to be emptied.

6. The apparatus of claim 5, further comprising warming means for warming the side walls of said storage tank to a temperature slightly above the freezing point of the liquid contained therein when said storage tank is to be emptied.

7. The apparatus of claim 6, wherein said transferring means directs warmed liquid onto the layer of ice when said storage tank is to be emptied.

8. The apparatus of claim 3, wherein said vertically oriented tube includes a vertical mixer.

9. The apparatus of claim 7, further comprising agitation means located in proximity to said bottom of said storage tank for agitating the liquid to achieve a uniform mixture when said storage tank is to be emptied.

10. The apparatus of claim 6, wherein the liquid is a fruit juice such as orange juice, grapefruit juice, pineapple juice, grape juice, apple juice, or the like.

11. The apparatus of claim 10, wherein the fruit juice comprises a single-strength orange juice having a Brix from about 10° to about 13°.

12. The apparatus of claim 10, wherein the fruit juice comprises a concentrated orange juice.

13. The apparatus of claim 4, wherein said temperature controlling means comprises a glycol tracer line running along said pipe system connected to a heat exchanger.

14. The apparatus of claim 6, wherein said warming means comprises a fan blowing warmed air onto the side walls of the storage tank.

15. The apparatus of claim 10, wherein said storage tank is maintained at a temperature from about 0° F. to about 35° F. during storage of the fruit juice.

16. The apparatus of claim 10, wherein said transferring means is maintained at a temperature from about 18° F. to about 30° F. during storage of the fruit juice.

17. The apparatus of claim 10, wherein said storage tank and said transferring means are warmed to a temperature of about 30° F. when said storage tank is to be emptied.

18. A method for storing an aqueous liquid in an ice slurry state, comprising
   introducing an ice slurry or a liquid into a storage tank and maintaining the temperature of the ice slurry at a temperature such that a layer of ice floats on a layer of liquid,
   withdrawing liquid from the bottom of the storage tank, and feeding it to the top of the tank at a rate faster than the rate of ice floatation while maintaining the liquid at a temperature such that the flow of liquid does not freeze solid, and
   transferring the liquid fed to the top of the tank below the layer of ice substantially without the liquid contacting the layer of ice.

19. The method of claim 18, further comprising a thawing step comprising warming the liquid to a temperature slightly above the freezing point of the liquid prior to feeding it to the top of the storage tank and warming the walls of the storage tank when the tank is to be emptied.

20. The method of claim 19, further comprising directing a portion of the warmed liquid onto the layer of ice when the tank is to be emptied.

21. The method of claim 20, wherein the liquid is a fruit juice such as orange juice, grapefruit juice, pineapple juice, grape juice, apple juice, or the like.

22. The method of claim 21, wherein said fruit juice comprises a single strength orange juice of about 10° to about 13° Brix.

23. The method of claim 21, wherein said liquid fruit juice is a concentrated orange juice.

24. The method of claim 21, wherein the temperature of the ice slurry in the storage is maintained from about 0° F. to about 35° F. during storage of the fruit juice.

25. The method of claim 21, wherein the temperature of the fruit juice fed to the top of the tank is maintained from about 18° F. to about 30° F. during storage of the fruit juice.

26. The method of claim 21, wherein the walls of the storage tank are warmed to a temperature not greater than about 35° F. when the tank is to be emptied.

* * * * *